Nov. 23, 1965 R. N. HURST 3,219,838
PULSE-WIDTH DISCRIMINATOR
Filed Nov. 13, 1961
FIG. 1.
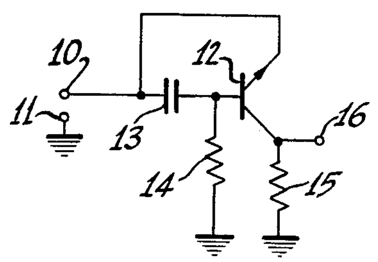
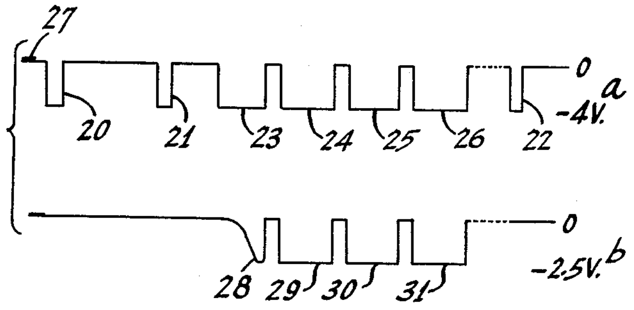
FIG. 2.
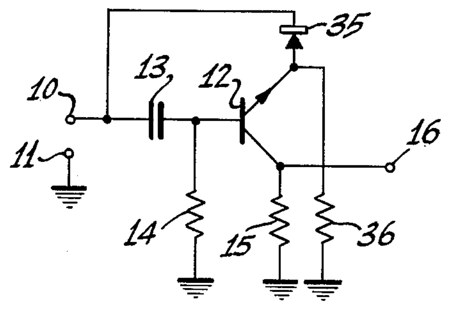
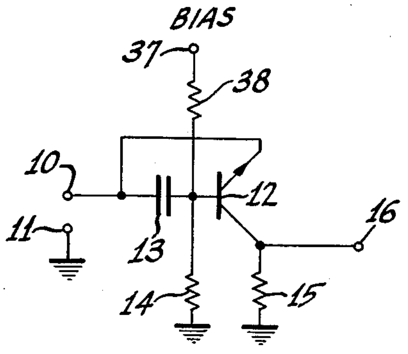
FIG. 3. FIG. 4.
INVENTOR.
ROBERT N. HURST
BY
Edward J. Norton
ATTORNEY United States Patent Office
3,219,838
Patented Nov. 23, 1965

3,219,838

PULSE-WIDTH DISCRIMINATOR

Robert N. Hurst, Haddonfield, N.J., assignor to Radio Corporation of America, a corporation of Delaware Filed Nov. 13, 1961, Ser. No. 151,745
11 Claims. (Cl. 307—88.5)

This invention relates to improved pulse-width discriminators for detecting broad pulses in a signal including both broad and narrow pulses.

Pulse-width discriminators which separate broad pulses from a signal including both broad and narrow pulses by generating an output pulse from the trailing edge of the broad pulse are known. Aside from the fact that the trailing edge is often not well-timed, such discriminators for the most part produce an output pulse only after the interval of the broad input pulse. No output is produced until the broad input pulse is ended. This operation is not tolerable in various types of precise equipment now being developed where the phase of the broad pulse interval as received must be known with great accuracy.

It its an object of the invention to provide an improved pulse-width discriminator.

Another object is to provide an improved pulse-width discriminator which measures the input pulse width directly, instantly giving an output as soon as the input pulse width exceeds a predetermined value.

A further object is to provide an improved pulse-width discriminator for generating output pulses in phase synchronism with input pulses wider than a predetermined width.

A still further object is to provide an improved pulse-width discriminator which requires a reduced number of components and is simple both in construction and in operation.

The objects are accomplished according to one embodiment of the invention by an arrangement including an active device in the form of a semiconductor junction transistor. The transistor includes base, emitter and collector electrodes. An input means is adapted to receive a signal composed of regularly recurring pulses of substantially constant amplitude including both narrow and broad pulses. The input means is directly coupled to the emitter electrode and is also coupled through a resistance-capacitance circuit to the base electrode. An output circuit is coupled to the collector electrode.

The time constant of the resistance-capacitance circuit is determined according to the width of the narrowest pulse to be detected. The value of the capacitance is limited by the spacing between the pulses. The time constant of the resistance-capacitance circuit along with the capacitance value are set so that the transistor remains non-conducting in response to the narrow input pulses having less than the predetermined width. A zero output voltage continues to appear at the collector electrode and at the output means so long as input pulses of a width less than the predetermined width are received.

Upon the reception of a broad input pulse of a width greater than the predetermined width, the resistance-capacitance circuit assumes a state whereby the transistor is made to conduct in response to the input pulse. The transistor thereafter conducts upon the reception of each succeeding input pulse so long as the width of each input pulse continues to be greater than the predetermined width. Output pulses coincident in time with the input pulses and of a voltage level determined by the voltage level of the input pulses appear at the output means.

Following the last broad input pulse and before the next narrow input pulse, the resistance-capacitance circuit returns to its original state in which the transistor is held non-conducting in response to input pulses of less than the predetermined width. The transistor remains non-conducting regardless of the input signal condition until another broad input pulse is received.

A more detailed description of the invention will now be given in connection with the accompanying drawing, in which:

FIGURE 1 is a circuit diagram of one embodiment of a pulse-width discriminator constructed according to the invention;

FIGURE 2 is a series of waveforms, lines *a* and *b*, on the same time axis, useful in describing the operation of the embodiment shown in FIGURE 1;

FIGURE 3 is a circuit diagram of another embodiment of a pulse-width discriminator constructed according to the invention; and FIGURE 4 is a circuit diagram of still another embodiment of a pulse-width discriminator constructed according to the invention.

Similar components in FIGURES 1, 3 and 4 are given the same reference numerals for ease of description.

In the embodiment of the invention shown in FIGURE 1, an input signal including both broad and narrow pulses of substantially constant amplitude is applied to input terminals 10, 11. Input terminal 11 is shown as coupled to a point of reference potential or return path hereinafter referred to as ground. The input terminal 10 is coupled directly to the emitter electrode of an NPN, semiconductor transistor 12. The input terminal 10 is also coupled through a capacitor 13 to the base electrode of transistor 12. A base resistor 14 is coupled between the point of reference potential or ground and the junction of capacitor 13 with the base electrode of transistor 12. The collector electrode of transistor 12 is coupled to an output terminal 16 and through a resistor 15 to ground.

In describing the operation of the embodiment given in FIGURE 1, reference will be made by way of example only to a particular application of the invention for detecting wide vertical synchronizing pulses in the presence of narrow horizontal synchronizing pulses in a television synchronizing signal. The separation of vertical synchronizing pulses from a television synchronizing signal is usually accomplished by low-pass filter arrangements commonly referred to as integrators. The wider vertical synchronizing pulses are detected on the basis of their greater energy content determined by the position of the trailing edge with respect to the leading edge of the pulses. Although this technique has the advantage of simplicity, the reliable use of such arrangements is limited to synchronizing signals including equalizing pulses.

Television synchronizing systems are presently employed which do not use equalizing pulses. In the absence of equalizing pulses, integrating arrangements as referred to above display a sensitivity to the position of the last horizontal or narrow synchronizing pulse preceding a wide vertical synchronizing pulse. Since this position changes by one-half line on alternate fields, a separated vertical synchronizing pulse will change its timing on alternate fields in systems using no equalizing pulses. This operation results in a loss of interlace or at least an impairment of interlace. The pulse-width discriminator of the invention is insensitive to this effect and will generate at its output accurate vertical synchronizing pulses without regard to the presence or absence of eqaulizing pulses in a television synchronizing signal applied thereto. It is particularly suitable for use in television equipment which operates on multiple standards.

It will be assumed that a television synchronizing signal employing the 405-line standard and not including equalizing pulses is applied to the input terminals 10, 11 of FIGURE 1. The negative-going synchronizing signal of one television field is shown in the waveform of FIGURE 2*a* as including horizontal synchronizing pulses 20, 21, 22 and wider vertical synchronizing pulses 23, 24, 25, 26. While only four horizontal synchronizing pulses are shown, a greater number may be included in the signal, as indicated by the dotted line section. For example, the British system presently employs eight horizontal synchronizing pulses in a sequence. The negative-going synchronizing signal is assumed to be 4 volts in amplitude. The horizontal synchronizing pulses 20, 21 and 22 may occur at a frequency of 10,125 cycles per second and are of a nominal width of 9±1 microseconds. The group of four vertical synchronizing pulses may be repeated at a 50 cycle per second rate, the individual pulses occurring at a 20,250 pulse per second rate with a nominal width of 40±2 microseconds.

Assuming an input signal as shown in the waveform of FIGURE 2*a* and described above, the following values may be assigned to the components included in the embodiment of the invention given in FIGURE 1.

| | | |
|---|---|---|
| Capacitor **12** | micromicrofarads | 4700 |
| Resistor **13** | ohms | 9.1K |
| Resistor **15** | do | 1.2K |

Transistor 11 may be of the type 2N585.

At point 27 on the waveform as shown in FIGURE 2, the input voltage appearing at terminals 10, 11 is first assumed to be instantaneously zero. No current flows in resistor 15, and the output voltage appearing at terminal 16 is zero, as indicated in the output waveform of FIGURE 2*b*. Upon the reception of the first narrow, horizontal synchronizing pulse 20, the input voltage at terminals 10 to 11 becomes a negative 4 volts. The current flowing in the base resistor 14 now charges capacitor 13, leaving no current to flow into the base electrode of transistor 12. Since the base current is zero, the collector current is also zero, and the output voltage remains at zero.

The time constant of the circuit including capacitor 13 and resistor 14 is determined according to the width of the vertical synchronizing pulses to be detected. With the values assigned above in accordance with the particular waveform shown in FIGURE 2*a*, the horizontal synchronizing pulse 20 ends before the capacitor 13 is charged sufficiently to cause conduction of transistor 12. Transistor 12 remains non-conducting for the duration of the pulse 20. The output voltage at terminal 16 remains at zero before, during and after the pulse. The operation is similar in response to the next horizontal synchronizing pulse 21, the charge on capacitor 13 leaking off during the interval between pulses through the emitter-base diode of the transistor 12.

Upon the reception of the first vertical synchronizing pulse 23, and with the values of capacitor 13 and resistor 14 selected as stated, the capacitor 13 becomes charged before the end of the pulse. The current in resistor 14 then flows into the base electrode of transistor 12 for the remaining period of the input pulse 23. The emitter electrode of transistor 12 becomes biased in the forward direction with respect to the base electrode, and transistor 12 conducts. The output voltage at terminal 16 assumes a value of approximately —2.5 v. as indicated at point 28 of the waveform of FIGURE 2*b*.

The size of capacitor 13 is determined in relation to the resistance of the emitter-base diode of transistor 12 so that capacitor 13 remains charged at the time of the next vertical synchronizing pulse 24. Since capacitor 13 is now charged, the current flows through base resistor 14 to the base electrode of transistor 12, and transistor 12 is caused to produce at output terminal 16 a negative-going pulse 29 shown in the waveform of FIGURE 2*b*. Output pulse 29 is in accurate phase synchronism with the input pulse 24. Similarly, output pulses 30, 31 in phase synchronism with the received vertical synchronizing pulses 25, 26 appear at output terminal 16.

Following the reception of the last vertical synchronizing pulse 26 of that sequence and before the reception of the next horizontal synchronizing pulse 22, capacitor 13 becomes discharged. A zero voltage appears at output terminal 16 and will continue to appear at output terminal 16 regardless of the input signal condition until the next vertical synchronizing pulse appears.

The operation of the circuit in response to the synchronizing signal of one television field has been described with the assistance of the curves in FIGURE 2. The operation of the circuit in response to the synchronizing signal of the interlaced or other television field is the same.

The lack of sensitivity of the invention to the interlace problems mentioned above is due at least in part to the fact that residual charges on capacitor 13 tend to be clamped out by the emitter-base diode of transistor 12 between input pulses. The emitter-base diode discharging path of capacitor 13 is of low resistance as compared to the charging path of resistor 14. After an input pulse, when there is no transistor action because of the lack of emitter-to-collector voltage, the impedance of the emitter base diode drops from the relatively high impedance of a transistor base to the relatively low impedance of a simple diode. During an input pulse, the resistance-capacitance network sees a high impedance. At the trailing edge of an input pulse, capacitor 13 sees a low impedance which rapidly drains away its charge. The clamping action is not fast enough to remove the charge on capacitor 13 between the periods of the vertical synchronizing pulses, resulting in the leading edge of the output pulse being substantially unchanged with respect to that of the corresponding input pulse.

While the embodiment of the invention shown in FIGURE 1 has been described in connection with a particular application, the invention is not to be considered as limited thereto. The pulse-width discriminator of the invention is adaptable for use in any application where it is desired to separate accurately broad pulses from a signal including both broad and narrow pulses. Transistor 12 remains non-conducting and a zero voltage appears at output terminal 16 for all narrow input pulses having a width less than a predetermined width determined by the time constant of the circuit including resistor 14 and capacitor 13. Once transistor 12 is made to conduct in response to a broad input pulse having a width greater than the predetermined width, transistor 12 conducts and generates an output pulse at terminal 16 substantially in phase synchronism with each succeeding broad pulse applied thereto. Upon the termination of the last broad pulse and before the reception of the next narrow pulse, the output voltage at terminal 16 returns to zero. The output voltage remains at zero until the next broad pulse is received.

The pulse-width discriminator of the invention is also adaptable in applications where, for example, it is desired to supply trigger pulses to a multivibrator or other switching circuit only in response to pulses of a width greater than a predetermined width and occurring at random times with respect to other pulses also included in an input signal. The embodiment of the invention shown in FIGURE 1 acts in response to such an input signal to generate an output pulse similar to the pulse 28 shown in the waveform of FIGURE 2*b* only for each input pulse of the proper width.

The pulse-width discriminator of the invention is to be distinguished from discriminators now known which generate an output pulse only after the occurrence of the trailing edge of an input pulse. As indicated in the waveforms *a* and *b* of FIGURE 2, the discriminator of the invention measures the pulse width of the broad pulses directly. An output is produced substantially instantaneously upon the width of an input pulse exceeding a predetermined value. Further, the invention achieves improved accuracy with respect to the more conventional use of integrators in determining the point at which the discriminator indicates the receipt of a wide pulse. The accuracy is achieved by causing capacitor 13 to charge toward a large voltage represented by the amplitude of the input pulse and intercepting the charging after less than half of this large voltage has been traversed. These voltage relationships insure that the interception or point at which transistor 12 conducts take place while the charging slope is still steep.

A feature of the invention, especially in some embodiments, is the fact that the discriminator requires no power supply or biasing means other than the input signal. Transistor 12 is operated in response to the input signal appearing at terminals 10 and 11, requiring no other biasing means or external control for its operation.

The embodiment of the invention shown in FIGURE 3 may be used where additional stability and control over the turn-on point of the transistor 12 are desired. A resistor 36 is connected between the emitter electrode of transistor 12 and ground. A unidirectional current conducting device which may be a silicon diode 35 is connected between the emitter electrode and terminal 10 with the arrow of diode 35 indicating the easy direction of conventional current flow therethrough. Resistor 36 is chosen so that when a negative input pulse is present at terminals 10 and 11, a few milliamperes are fed through the diode 35, biasing the diode 35 in the forward direction. A constant potential of approximately 0.7 volts, for example, appears across the diode 35. This plus the 0.25 volt normally required to turn on the transistor 12, provides a total off-bias of 0.95 volt. The turn-on point of transistor 12 is determined with greater reliability.

The stability of the pulse-width discriminator may also be increased by the embodiment of the invention shown in FIGURE 4. A terminal 37 connected to a negative fixed bias voltage supply is connected through a resistor 38 to the junction of capacitor 13 and the base resistor 14. The arrangement of FIGURE 4 assumes the availability of an external bias supply whereas no such bias supply is required in the arrangement of FIGURE 3. The bias, instead of being fixed, may be made to follow changes in the amplitude of the input pulses, providing that the input pulses and bias are generated by the same power source.

While the invention is described as including an NPN junction transistor responsive to a negative pulse input signal, the invention may be modified in a manner understood in the art to include a PNP junction transistor responsive to a positive pulse input signal. A field-effect transistor could be used by attaching the source in place of the emitter electrode of transistor 12, the gate in place of the base electrode, and the drain in place of the collector electrode.

What is claimed is:

1. A pulse-width discriminator comprising, in combination, a junction transistor having base, emitter and collector electrodes, a capacitor, a point of reference potential means to apply an input signal including pulses of more than one width directly to said emitter electrode with respect to said point of reference potential and to one side of said capacitor with said first-mentioned means forming the sole connection to said emitter electrode, means to connect the other side of said capacitor directly to said base electrode, a resistor coupled between said base electrode and said point of reference potential, a second resistor directly connected between said collector electrode and said point of reference potential, and output means coupled to said collector electrode.

2. A pulse-width discriminator comprising, in combination, a NPN transistor having base, emitter and collector electrodes, a capacitor, means to apply an input signal including negative-going pulses of more than one width to said emitter electrode with respect to a point of reference potential and to one side of said capacitor, said first-mentioned means forming the sole connection to said emitter electrode, means to couple said base electrode directly to the other side of said capacitor, a resistor coupled directly between said base electrode and said point of reference potential, and output means coupled to said collector electrode.

3. A pulse-width discriminator comprising, in combination, a transistor device having base, emitter and collector electrodes, input means responsive to a signal including pulses of more than one width, means to apply said pulses from said input means to said emitter electrode with respect to a point of reference potential, said pulse applying means forming the sole connection to said emitter electrode, a control circuit including resistance and capacitance directly coupled between said input means, said point of reference potential and said base electrode and having a time constant determined according to the width of the narrowest pulse to be detected, the time constant of said control circuit being set so as to cause said transistor device to conduct in response to and at the same time as a pulse received from said input means upon the width of the received pulse exceeding a predetermined value and a conduct in response to each succeeding pulse so long as the width of said succeeding pulses exceeds said predetermined value, and output means coupled to said collector electrode.

4. A pulse-width discriminator comprising, in combination, a transistor device having base, emitter and collector electrodes, input means adapted to receive a signal including narrow pulses occurring at one frequency rate and broad pulses occurring at a second frequency rate greater than said first frequency rat, a capacitor, means to apply said pulses from said input means to said emitter electrode and through said capacitor to said base electrode with respect to a point of reference potential, said pulse applying means forming the sole connection to said emitter electrode, a resistor coupled between said base electrode and said point of reference potential, said capacitor and said resistor forming a circuit having a time constant determined so as to cause said transistor device to conduct only in response to a received broad pulse upon the width of the received broad pulse exceeding a predetermined value and to conduct in response to each succeeding broad pulse following said received broad pulse which occurs before the appearance of the next narrow pulse in said signal and output means coupled to said collector electrode.

5. A pulse-width discriminator comprising, in combination, a NPN transistor device having base, emitter and collector electrodes, input means including a pair of input terminals adapted to receive across said terminals a signal including negative-going narrow pulses occurring at one frequency rate and negative-going broad pulses occurring at a second frequency rate greater than said first frequency rate, means to connect said emitter electrode solely to one of said terminals, a capacitor, means to connect one side of said capacitor directly to said one terminal, means to connect the other side of said capacitor directly to said base electrode, a resistor directly connected between said base electrode and the other one of said terminals, said resistor and said capacitor forming a circuit having a time constant determined according to the width of said broad pulses, the size of said capacitor being limited by the spacing between said broad and narrow pulses, the time constant of said circuit being set so as to cause said transistor device to conduct only in response to a received broad pulse upon the width of the received broad pulse exceeding a predetermined value and to conduct in response to each succeeding broad pulse following said received broad pulse which occurs before the appearance of the next narrow pulse in said signal, and output means coupled to said collector electrode.

6. A pulse-width discriminator comprising, in combination, a transistor device having base, emitter and collector electrodes, input means adapted to receive a signal including pulses of more than one width, a unidirectional current conducting device having anode and cathode electrodes, means to connect said anode electrode to said emitter electrode, means to apply said pulses from said input means to said cathode electrode with respect to a point of reference potential, a resistor connected between said emitter electrode and said point of reference potential, a capacitor, means to connect one side of said capacitor to said input means and to connect the other side of said capacitor to said base electrode, a second resistor connected between said base electrode and said point of reference potential, a third resistor connected between said collector electrode and said point of reference potential, output means coupled to said collector electrode, the value of said first resistor being determined so as to control the turn-on time of said transistor device in response to said pulses by developing a proper control bias across said unidirectional current conducting device upon the application of a pulse to said input means.

7. A pulse-width discriminator comprising, in combination, a transistor device having base, emitter and collector electrodes, input means including a pair of terminals adapted to receive a signal including pulses of more than one width with one of said terminals being connected to a point of reference potential, a capacitor, means to connect the other one of said terminals through said capacitor to said base electrode, means to connect said other terminal directly to said emitter electrode with said last-mentioned means forming the sole connection to said emitter electrode, a resistor coupled between said base electrode and said point of reference potential, a second resistor coupled between a source of bias potential and said base electrode to determine the turn-on time of said transistor device in response to said pulses, and output means coupled to said collector electrode.

8. A pulse-width discriminator comprising, in combination, a transistor device having base, emitter and collector electrodes, input means adapted to receive a signal including pulses of more than one width and arranged to apply said pulses to said emitter electrode with respect to a point of reference potential, a capacitor connected between said input means and said base electrode, a resistor coupled between said base electrode and said point of reference potential, said capacitor and said resistor forming a circuit having a time constant determined so as to permit said transistor device to conduct only in response to a received pulse upon the width of the received pulse exceeding a predetermined value and while the charging slope of said capacitor is still steep, a second resistor coupled between said collector electrode and said point of reference potential, and means to derive an output signal across said second resistor.

9. A pulse-width discriminator comprising, in combination, a transistor device having base, emitter and collector electrodes, input means adapted to receive a signal including narrow pulses occurring at one frequency rate and broad pulses occurring at a second frequency rate greater than said first frequency rate, means to apply said pulses from said input means to said emitter electrode with respect to a point of reference potential, said pulse applying means forming the sole connection to said emitter electrode, a capacitor connected between said input means and said base electrode, a resistor coupled between said base electrode and said point of reference potential, said capacitor and said resistor forming a circuit having a time constant determined so as to cause said transistor device to conduct while the charging slope of said capacitor is still steep only in response to and at the same time as a received broad pulse upon the width of the received broad pulse exceeding a predetermined value and to conduct only in response to each succeeding broad pulse following said received broad pulse which occurs before the appearance of the next narrow pulse in said signal, a second resistor connected between said collector electrode and said point of reference potential, and means for deriving an output pulse signal across said second resistor.

10. A pulse-width discriminator comprising, in combination, a transistor having base, emitter and collector electrodes, input means including a pair of input terminals adapted to receive across said terminals a signal including pulses of more than one width, a capacitor, means to connect one side of said capacitor directly to one of said terminals and to connect the other side of said capacitor directly to said base electrode, a resistor, means to connect one end of said resistor directly to the other of said terminals and to connect the other end of said resistor directly to said base electrode, means to connect said emitter electrode only to said one terminal so that said last-mentioned means forms the only connection to said emitter electrode, the value of said capacitor and of said resistor being determined to form a time constant circuit which causes said transistor to conduct only in response to a pulse received from said terminals upon the width of the received pulse exceeding a predetermined value, and output means coupled to said collector electrode.

11. A pulse-width discriminator comprising, in combination, a current conducting device having first and second input electrodes and an output electrode, a capacitor, a point of reference potential, means to apply an input signal including pulses of more than one width directly to said first electrode with respect to said point of reference potential and to one side of said capacitor with said first-mentioned means forming the sole connection to said first input electrode, means to connect the other side of said capacitor directly to said second input electrode, a resistor coupled between said second input electrode and said point of reference potential, a second resistor directly connected between said output electrode and said point of reference potential, and output means coupled to said output electrode.

References Cited by the Examiner

UNITED STATES PATENTS

| | | | |
|---|---|---|---|
| 2,890,352 | 6/1959 | Goodrich | 307—88.5 |
| 3,076,103 | 1/1963 | Bianchi | 307—88.5 |

OTHER REFERENCES

Millman et al.: Pulse and Digital Circuits (text).

ARTHUR GAUSS, *Primary Examiner.*

JOHN W. HUCKERT, *Examiner.*